June 5, 1934. A. TROSCH 1,961,259
MACHINE TOOL
Filed June 28, 1929 7 Sheets-Sheet 4
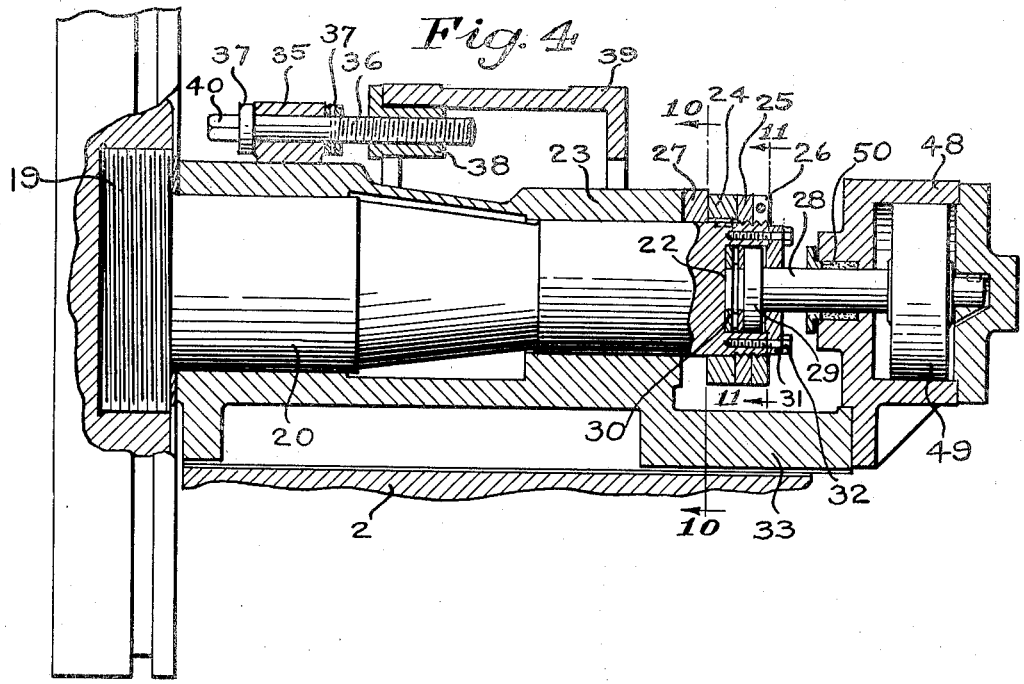
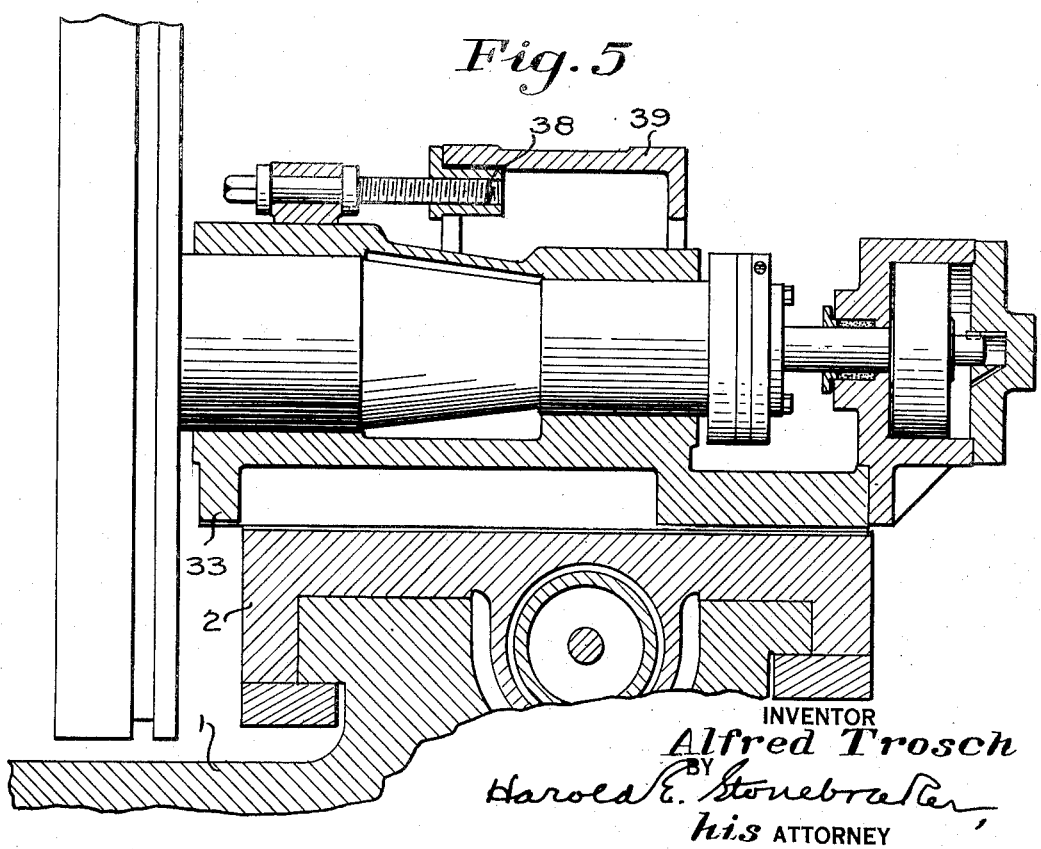
INVENTOR
Alfred Trosch
BY Harold E. Stonebraker
his ATTORNEY June 5, 1934.                    A. TROSCH                    1,961,259
                                MACHINE TOOL
                   Filed June 28, 1929        7 Sheets-Sheet 5
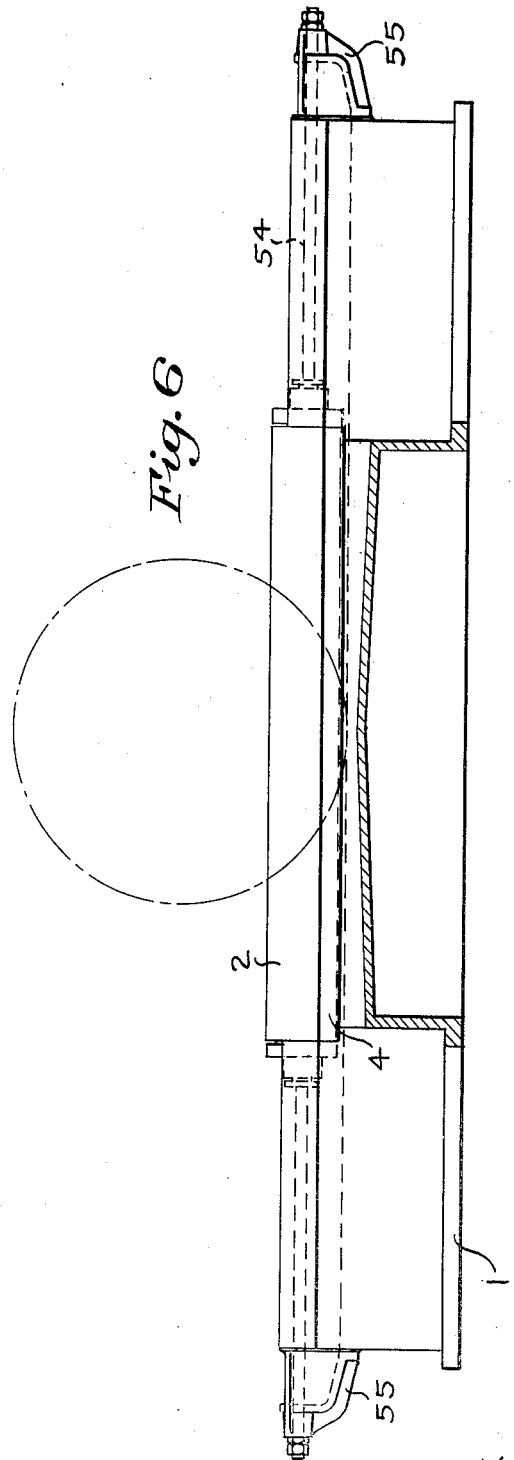
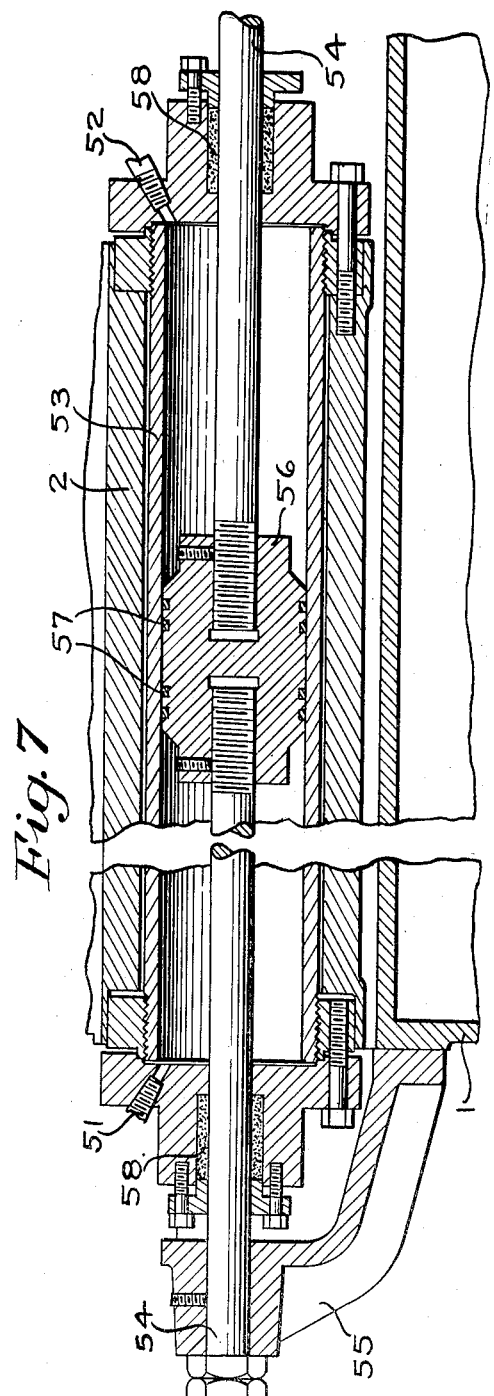
INVENTOR
Alfred Trosch
BY
Harold E. Stonebraker
his ATTORNEY

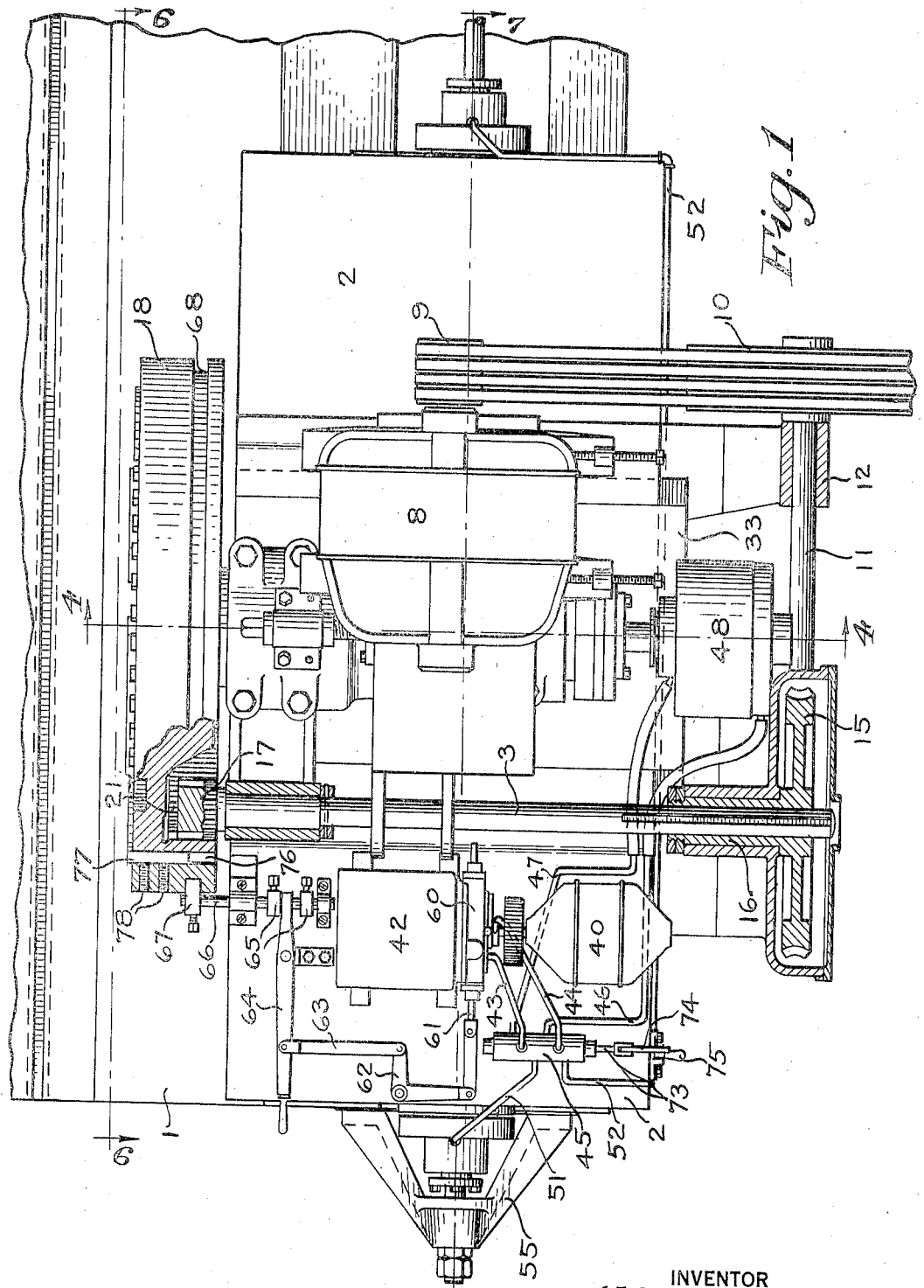

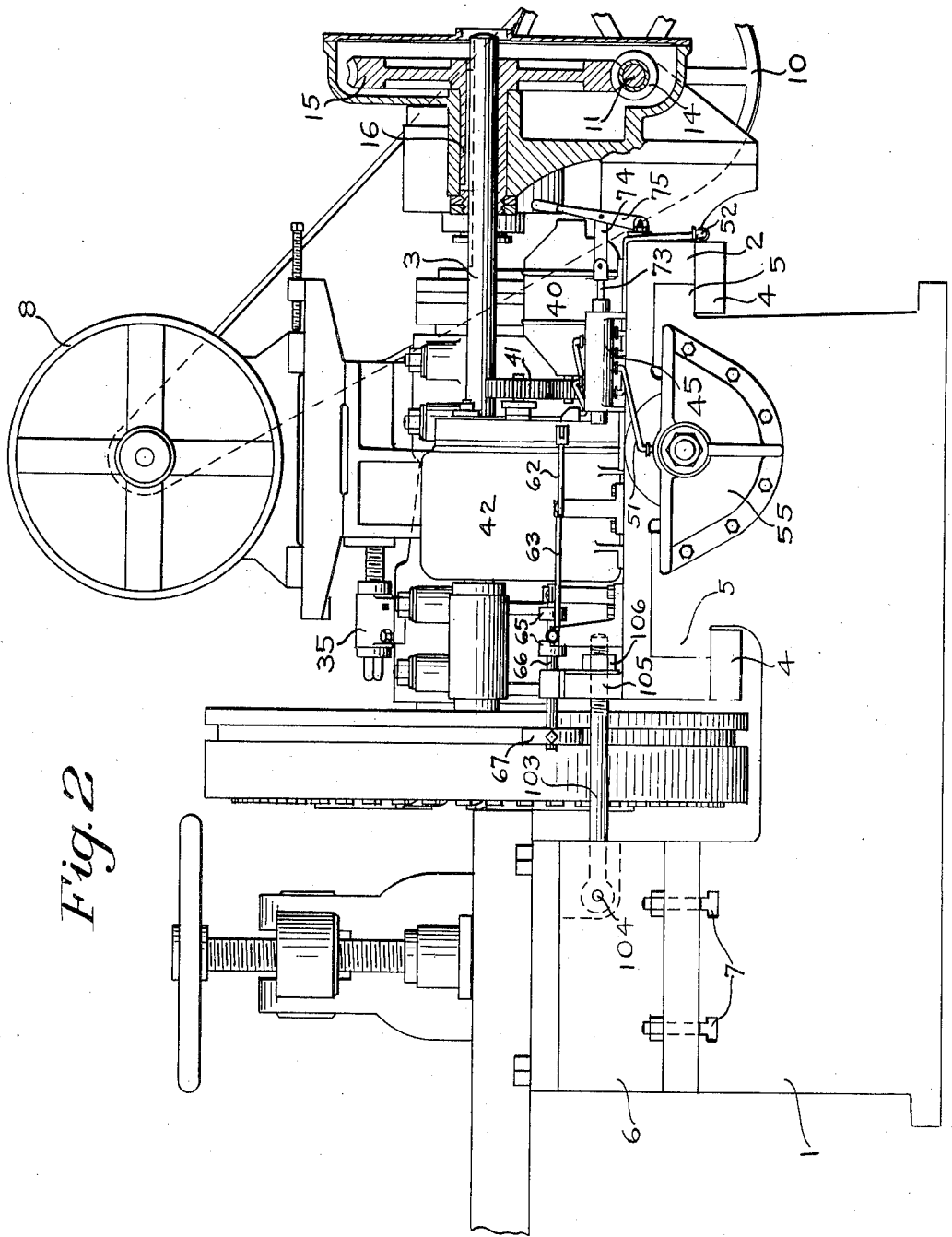

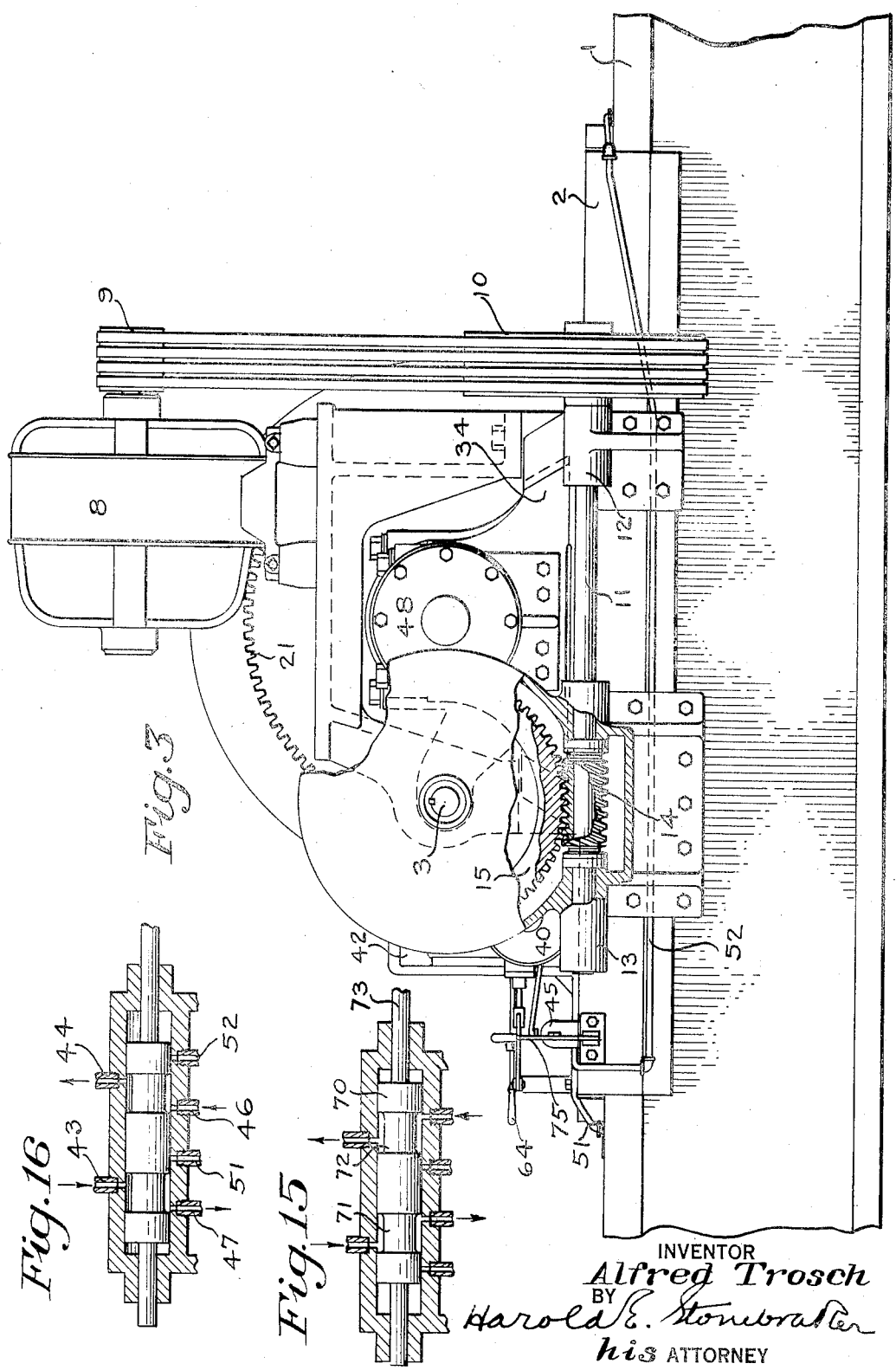

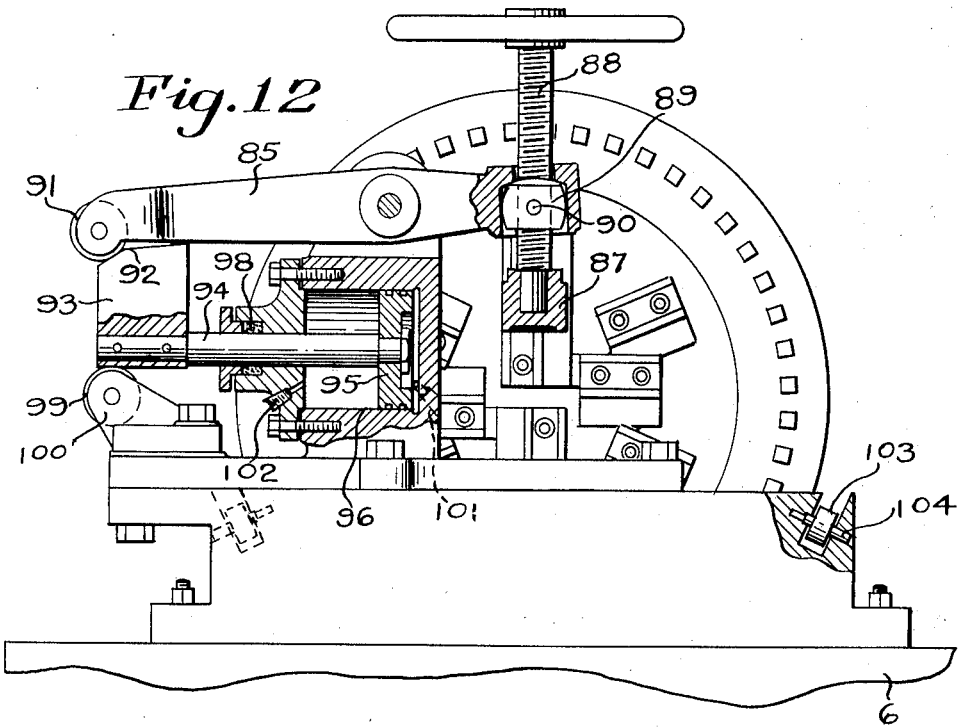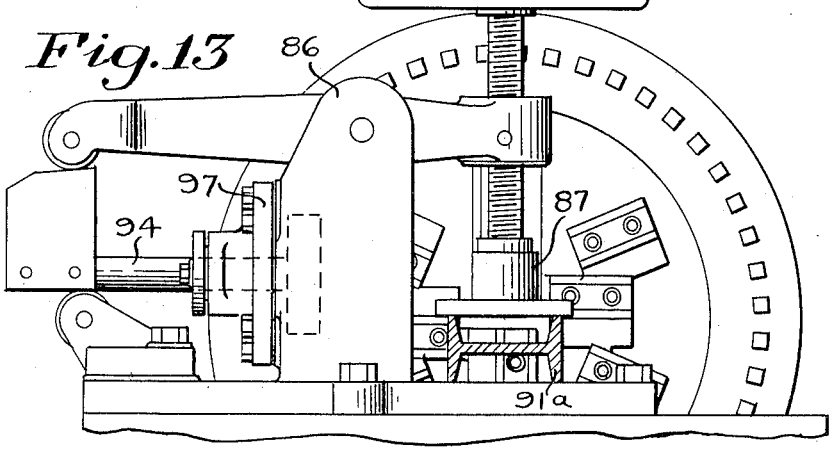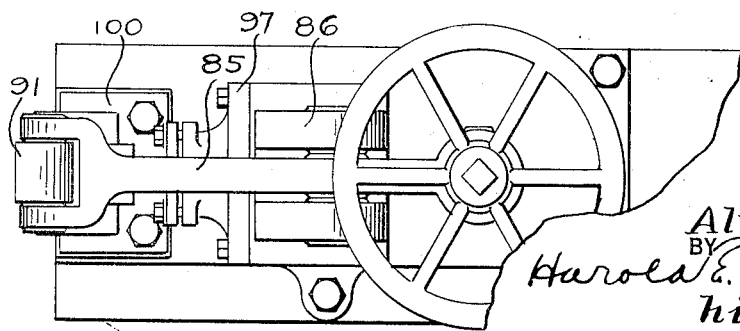

Patented June 5, 1934

1,961,259

UNITED STATES PATENT OFFICE 1,961,259

MACHINE TOOL

Alfred Trosch, Rochester, N. Y., assignor to Consolidated Machine Tool Corporation of America, Rochester, N. Y., a corporation of Delaware Application June 28, 1929, Serial No. 374,522

7 Claims. (Cl. 90—15)

This invention relates to machine tools, and especially to that class of machine tools employed for finishing columns and I-beams used in the construction of the framework of buildings, bridges, etc.

The object of the invention is the provision of a machine of this class which is simple in construction and operation and capable of performing a greater variety of work than machines as heretofore constructed.

Another object of the invention is to provide a machine tool having a rotary tool head adapted to carry both planer and facing tools.

Another object of the invention is to provide a machine of this kind in which the tool head moves longitudinally of its axis for performing one kind of work, and in a plane at substantially right angles thereto for performing another kind of work, means being provided which render one set of moving devices inoperative when the other set is rendered operative.

A still further object of the invention is to provide a machine of this kind in which the rotary tool head is moved in two directions for performing different kinds of work by fluid pressure means, such as oil under pressure, means being provided for directing the flow of the fluid from one set of moving means to the other to render one inoperative when the other is operative.

To these and other ends, the invention comprises the structure and combination of parts which will appear more clearly from the following description when read in conjunction with the accompanying drawings, the novel features being pointed out in the claims following the specification.

In the drawings:

Figure 1 is a plan view of a machine constructed according to one embodiment of the invention;

Figure 2 is a side elevation of the same;

Figure 3 is a rear elevation of the machine, parts being sectioned away to expose underlying parts;

Figure 4 is a section on the line 4—4 of Figure 1, looking in the direction of the arrow at said line;

Figure 5 is a similar view showing the parts in another position;

Figure 6 is a section showing carriage moving devices and taken on line 6—6 of Figure 1, looking in the direction of the arrow at said line;

Figure 7 is an enlarged section of the same taken on the line 7—7 of Figure 1, looking in the direction of the arrow at said line;

Figure 12 is a front elevation of the work support, parts being sectioned away for clearness;

Figure 13 is a similar view showing some of the parts in other positions;

Figure 14 is a plan view of the devices shown in Figure 13;

Figure 15 is a section through the valve for controlling certain hydraulic devices, and Figure 16 is a similar view showing the parts in other positions.

Figure 8:
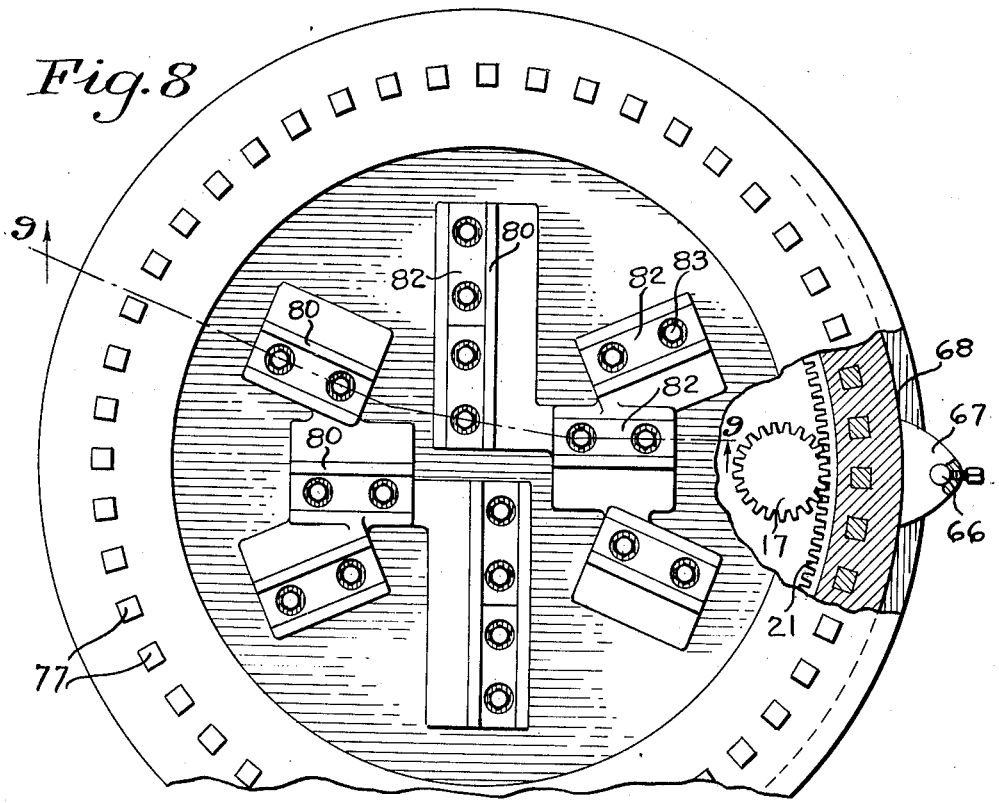
Figure 8 is an enlarged front elevation of the tool head, a portion being broken away to illustrate the driving and control devices.

Similar reference characters refer to the same parts in all the figures of the drawings. The beams, girders or columns used in construction work, as well as other metal parts formed by casting are often rough and imperfect at those points where they are joined to other parts, so that it is impossible to fit them together as they come from the foundry. In the past, it has been the practice to finish or face these parts by removing excess metal and squaring imperfect joints on a rotary planing machine and finishing the work on a facing machine. Two machines have thus been required for this work. The machine described herein has been designed for the purpose of performing both of these operations on a single machine, thus facilitating the work and avoiding the labor of handling the material over the second time.

In the drawings is illustrated a machine embodying one possible construction for accomplishing this result. Said machine comprises a work support for a work piece to be operated on, and a tool head in which the tools are carried which operate on the work piece. When performing planer operations, the tool head is moved transversely of the work piece to bring the tools into engagement therewith. To this end, the tool head is mounted on a spindle which is revolubly mounted on a carriage adapted to move transversely in guideways on the base or main support of the machine. For planer operations, the tool head is moved axially to and from the work piece on the work support. To this end, the tool spindle is mounted for axial reciprocation on the transversely movable carriage, and independently operable devices are provided for moving the carriage transversely or the tool spindle axially.

Referring to Figure 2, said machine comprises a base or support 1 on which is mounted a transversely movable tool carriage 2, which carries the main tool spindle having both rotary and longitudinal movement. The carriage has inwardly projecting lugs or flanges 4 engaging beneath outwardly projecting flanges 5 on the base, forming a guideway. At the front of the base is a work support 6 which is transversely adjustable on its support and may be secured in adjusted position by means of T-bolts 7 as usual in the art.

Means are provided for driving the tool spindle at a comparatively slow rate of speed. Said means comprises a motor 8 of usual or preferred construction having a pulley 9 on its drive shaft connected by means of flexible belts to a pulley 10 on the end of a transversely extending shaft 11 mounted in bearings 12 and 13 and having a worm 14 secured thereto adjacent its other end.

It will be understood that the pulleys 9 and 10 may be of the usual cone type if desired to vary the speed of the driven shaft 11. The bearings 13, see Figure 3, are formed on a bracket embracing the worm 14 so that the worm may serve as a thrust bearing for the shaft, and the bracket may also provide a housing for the worm and the worm wheel 15 engaged thereby.

The worm 14 engages the worm wheel 15 which has an inwardly projecting hub 16 whereby it is keyed to a shaft 3 adjacent its rear end so that the shaft may move longitudinally relatively thereto but rotate as a unit therewith.

On the forward end of the shaft 3 is mounted to rotate therewith a pinion 17, see Figure 8, which engages an internal gear 21 on the tool head 18, presently to be described. The tool head 18 is threaded on an enlarged portion or head 19, see Figure 4, of the longitudinally extending spindle 20 revolubly mounted in suitable bearings for longitudinal movement. The spindle 20 is of comparatively large diameter to provide a large bearing surface for its bearings. The spindle 20 is slidable in its bearings and the driving shaft 3 partakes of these sliding movements by reason of the engagement of its pinion with the internal gear and moves in the hub of the worm wheel 15 to which it is keyed.

When facing a column or beam, it is desirable to impart limited longitudinal movements of the tool head toward and from the work piece. To this end, in the present embodiment, the spindle 20 is counterbored at its rear end as at 22 to provide an opening or recess for operating devices presently to be described, see Figures 4, 5, 10 and 11. At a short distance to the rear of the bearing 23 a thrust bearing 24 is keyed to the spindle and held against excessive rearward movement toward the end of the spindle by means of a nut 25 threaded thereon and locked in position by means of a split lock nut 26.

When using the device as a rotary planer, it is desirable to lock the spindle 20 against longitudinal movement in its retracted position. To this end, locking means are provided in the form of a pivoted arm 27 arranged to engage or occupy the space between the bearing 24 and the rear end of the main bearing 23 to prevent longitudinal forward movement of the shaft in its bearings, or it may be swung on its pivot to the position shown in Figure 11 to permit such movement. Projecting into the open rear end 22 of the shaft is a longitudinally movable rod 28, having a ring or disk 29 fixed thereto and seated within the opening. The ring 29 engages the roller thrust bearings 30 seated in the bottom of the opening in its forward movement, and in its rear movement engages a ring 31 which surrounds the rod and is secured to the end of the spindle by means of the headed screws 32. When the rod 28 moves forward the ring 29 fixed thereon engages the roller bearings and moves the spindle 20 and the tool head forwardly toward the work piece. Hydraulic devices, hereinafter described, are provided for reciprocating the rod 28.

Means are provided for conveniently adjusting the tool head forwardly and rearwardly toward and from the work piece. To this end, the bearings for the spindle 20 are mounted on a carriage 33 slidably mounted in longitudinally extending guideways 34 provided therefor on the carriage 2, see Figure 3. Swiveled in an ear 35 on the carriage 33, see Figures 4 and 5, is a screw or bolt 36 arranged parallel with the axis of the spindle 20 or the guideways in which the carriage 33 moves. The screw 36 has collars 37 secured thereto and arranged to engage opposite ends of the ear or lug 35 to prevent longitudinal movement of the screw in the ear.

The rear end of the screw is threaded in a sleeve 38 mounted in a bracket 39 on the carriage 2. The forward end 40 of the screw is made angular in cross-section so that it may be conveniently rotated by means of a suitable tool. By rotating the screw in one direction the carriage with the tool head and other parts mounted thereon may be moved bodily on the carriage 2 in one direction, and in the opposite direction by reversing the direction in which the screw is turned.

When employing the machine as a rotary planer, it is desirable to move the tool head transversely of the work piece, and when employed as a facing machine the tool head is reciprocated toward and from the work piece. Fluid pressure means, preferably hydraulic, are provided for moving the carriage 2 to move the tool head transversely of the work piece and also for moving the tool head and its shaft longitudinally toward and from the work piece. Said means comprises a motor 40, Figure 1, mounted on the carriage 2, having its drive shaft connected by gears 41, see Fig. 2, with the drive shaft of a variable delivery hydraulic pump 42 of usual or preferred construction and having delivery and return pipes or passages 43 and 44 communicating with a six-way valve 45, shown in section in Figures 15 and 16 of the drawings. Leading from the valve 45 are the pipes or passageways 46 and 47 which communicate with opposite ends of a piston chamber 48 on the rear end of the carriage 33, see Figures 4 and 5. The rod 28 projects into the forward end of this chamber and has its rear end keyed thereto to permit sliding movements but preventing relative rotation, and has a piston 49 secured thereto within the chamber. Fluid pressure applied to one end or the other of the piston 49 moves it with its rod from the Figure 4 position to the Figure 5 position, or vice versa, to move or feed the spindle 20 with the tool head toward the work piece or retract the same. A stuffing box 50 seals the bearing of the rod in the piston chamber.

Also leading from the valve 45 are pipes or passages 51 and 52 leading to a piston chamber 53 carried on the carriage 2 and arranged within a depression in the upper surface of the base of the machine, see Figures 2, 6 and 7 of the drawings. A piston rod 54 is carried in brackets 55 on the base of the machine and extends through the cylinder 53 in which it has a piston 56 secured thereto which has suitable piston rings 57. It will be understood that the rod 54 is fixed to the base 1 or in brackets fixed thereon and that the cylinder 53 moves on the rod to move or feed the carriage and the tool head transversely when hydraulic pressure is admitted through one or the other of the passages 51 or 52. The bearings of the cylinder on the rod may be sealed by means of suitable stuffing boxes 53. The rod 54 is shown as constructed of two parts for convenience in assembling, but operates as a single piece.

Means are provided for controlling the variable delivery pump either manually or by means actuated by the movement of the tool head. Connected with the pump is a control valve 60 having a neutral central position and movable therefrom to vary or increase the pressure of the liquid delivered therefrom in either direction as may be desired. Pivoted to the end of the valve stem 61 is one arm of a bell crank lever 62, the other arm of which is connected by a link 63 with an arm of a lever 64, the other arm of which is arranged between a pair of collars 65 adjustably secured to a slidable rod or plunger 66. The rod 66 is slidably mounted in its bearings and extends forwardly adjacent the periphery of the tool head. At its forward end it is provided with a projection in the form of a shoe 67, see Figure 8, which engages in a circumferential groove 68 provided therefor in the periphery of the tool head. When the tool head is moved in either direction on its carriage by the action of the piston 49, the rod 66 by reason of its engagement with the tool head moves one or the other of the collars 65 into engagement with the lever 64 and moves it to actuate the valve through the link 63 and the bell crank 62.

The extent of movement of the tool head may be controlled by the adjustment of the collars or the collars may be rendered inoperative by disconnecting them from the rod 66. It is usually desirable to feed the tools forwardly at a comparatively slow speed as the work progresses, and to retract them at a greater speed. This is accomplished by the variable speed hydraulic pump, the details of which are not described herein since it forms no part of the present invention. However, it will be noted that movement of the head in one direction moves the control valve of the pump in one direction from its central neutral position and the reverse movement moves the valve control in the opposite direction and reverses the direction of hydraulic pressure delivered by the pump. By proper adjustment of the collars 65, the time of reversal of hydraulic pressure can be adjusted to the desired extent of projection of the tool head, that is, the extent of feed movement of the tools on the work piece.

Means are provided for actuating the pump valve manually when the collars are released from the rod. To this end, the lever 64 extends laterally of the link 63 and is provided with a handle 68 at its end. During the above described operations, it will be understood that the valve 45 is set in the position shown in Figure 16, in which the fluid pressure is directed to the pipes or passages leading to the facer cylinder 48.

When it is desired to use the machine as a rotary planer, the tool head is disconnected from its operative connection with the pump valve, as above described, and the six-way valve set to the position shown in Figure 15, in which the fluid pressure is directed to the passages leading to the planer cylinder 53. The valve is operated manually and comprises a valve cylinder 70 movable longitudinally in the housing and having cutaway portions 71 and 72.

When in the Figure 16 position, the inlet and outlet passages 43 and 44 are directed to the passages leading to the facer cylinder 48 through the cut-away portions, and the passages leading to the planer cylinder 53 are closed by the uncut portion. When the valve cylinder is moved to the Figure 15 position, the inlet and outlet passages are connected with the passages leading to the planer cylinder and the passages leading to the facer cylinder 48 are closed by the uncut portions of the valve cylinder. At an intermediate position, all the passages to the cylinder may be closed. The valve cylinder has suitable bearings in the ends of the housing and one end of the cylinder as 73 is extended and connected by means of a link 74 with a lever 75 by which it may be manually operated. When thus used as a planer, the spindle 20 may be secured against longitudinal movements by the device 27.

Figure 9:
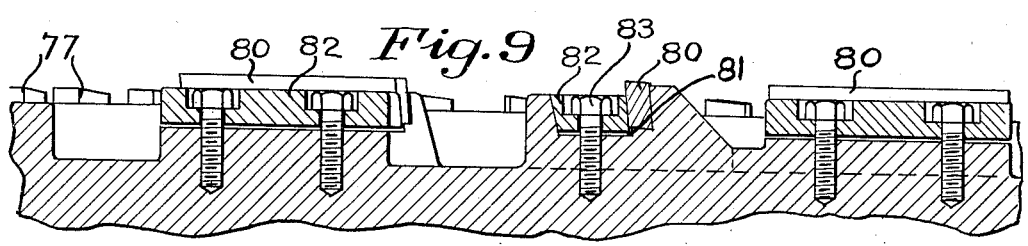
Figure 9 is an enlarged section taken on line 9—9 of Figure 8, and looking in the direction of the arrow at said line.
Figure 11:
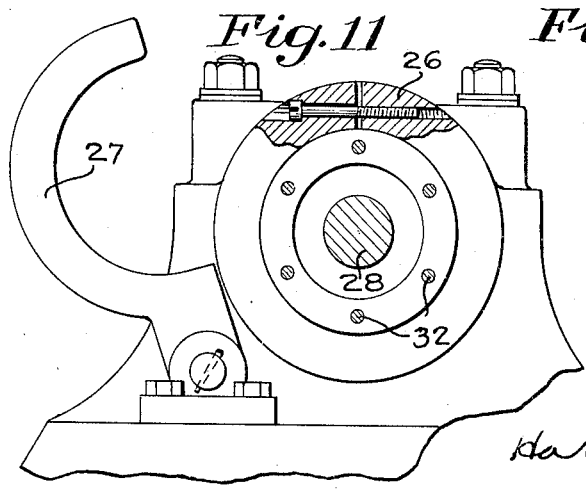
Figure 11 is a section taken on line 11—11 of Figure 4, and looking in the direction of the arrow at said line.
Figure 10:
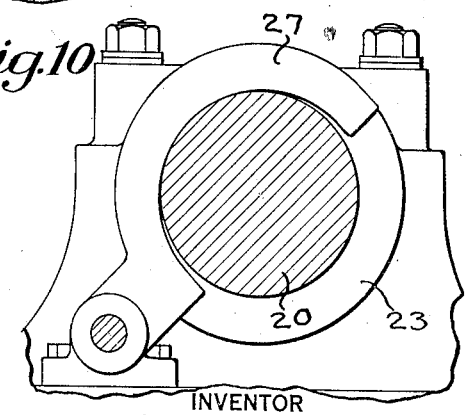
Figure 10 is a section taken substantially on line 10—10 of Figure 4, and looking in the direction of the arrow at said line.

A special tool head has been provided, adapted to be provided with rotary planer tools and also facer tools. The details of this head are best shown in Figures 8 and 9 of the drawings. Adjacent its outer periphery and arranged circumferentially about the center of the head is a series of openings 76 in which the planer tools 77 are inserted. Set screws 78 engage radial threaded openings in the periphery of the head and engage the tools to hold them in proper adjusted position, see Figure 1. The facing tools 80 are adapted to be arranged about the center of the head and are mounted in grooves or depressions 81 provided therefor in the face of the head. The side walls of the grooves are slightly inclined, as shown in Figure 9, and the tools are clamped in the grooves by means of plugs or clamping devices 82 also having inclined walls adapted to engage the inclined wall of the groove on one side and the facing tool on the other. Headed screws 83 pass through openings in the clamping devices and engage tapped openings provided therefor in the head.

Although eight facing tools are shown as secured to the head, it will be understood that this invention is not limited to any particular number or arrangement of the tools, but that any suitable number or arrangement of tools may be employed without departing from the spirit or intent of this invention. It will be noted that the facing tools are mounted somewhat in advance of the planer tools so that either set of tools may be used independently of the other set, and by this arrangement, the machine may be used either as a facing machine or as a rotary planer without removing either set of tools from the head.

Any suitable or well known type of work holding device may be used. That shown in the drawings, Figures 12, 13 and 14, comprises a pneumatic clamping arrangement having a lever or clamping member 85 pivoted in a pair of ears 86 provided therefor one the transversely adjustable carriage 6. The lever 85 is arranged transversely of the machine and at its inner end carries a clamping member 87 which is swiveled on the lower end of a screw 88 adjustable in the inner end of the lever and having a hand wheel at its upper end for turning it. This screw is mounted in an internally threaded nut 89 which is mounted in the end of the lever in which it has a limited swinging movement, about the axis of a set screw 90 which holds it in the lever. When in operative position, the clamping member is adapted to engage and hold a work piece 91ª in position on the work support while the tools operate thereon, and may be adjusted for work pieces of different sizes by manipulation of the screw 88. The opposite end of the lever 85 is offset and provided with a roller bearing 91 which engages an operating cam 92 on a head 93 secured to the other end of a piston rod 94 extending inwardly and having its inner end secured to a piston 95 in the cylinder 150

96. The open end of the cylinder is closed by means of a suitable head 97 and sealed by means of a gasket, as usual.

The head has a central opening in which the piston rod reciprocates, the bearing of which is sealed by means of a stuffing box 98. The head 93 rests and moves on a roller bearing 99 provided therefor and mounted in a bracket 100 secured to the base of the work support. When it is desired to clamp a work piece on the support, fluid pressure such as compressed air or steam is admitted to the piston cylinder through the port 101 from any suitable source of supply which moves the piston and the cam block connected therewith, the lever 85 moving upwardly on the cam moves the clamping member into engagement with the work piece. When it is desired to release the work piece, the operation is reversed by admitting the compressed fluid to the cylinder through the port 102 on the opposite side of the piston.

With a machine of this type designed as it is to operate on large heavy work, there is a tendency of the parts to spring slightly, causing uneven cutting and sometimes chattering, particularly when used as a facing tool. Means have been provided for more rigidly connecting or anchoring the work support to the machine when operating the machine as a facing tool. Said means comprises a plurality of tie rods 103 pivoted at 104 in recesses provided therefor in the rear wall adjacent the sides of the work support 6. These rods extend rearwardly adjacent the outer periphery of the tool head and extend through lugs 105 provided therefor on the carriage 2. The rear ends of these rods are threaded for the reception of nuts 106. It will be noted that by this construction, the tool support and the carriage on which the tool head is mounted are tied together to prevent the parts from springing apart longitudinally. It will also be noted that the spindle on which the tool head is mounted is of comparatively large diameter so that the portion of the area of the tool head on which the facing knives are mounted is forward of the spindle so that the thrust strain is communicated directly to the spindle and the piston 49 which controls its axial movement. By this construction, a strong rigid device is provided which secures a firm engagement of the tools with the work piece.

The operation of the machine will now be briefly described. Assuming that it is desired to use the machine for column facing operations, the machine is set up substantially as shown in the drawings and the six-way valve adjusted to direct the hydraulic pressure to the piston cylinder 48. The motor 8 may now be set in operation which rotates the main drive shaft 3 through the worm and gear, and through the pinion 17, the tool head. The motor 40 is also set in motion. This motor operates the hydraulic pump 42 and supplies hydraulic pressure to the piston cylinder 48 to move the tool head first forwardly into engagement with the work piece. This movement actuates the levers 64 and 62 to actuate the pump valve and reverses the direction of the flow of liquid to reverse the movement of the piston 49 to retract the tool head from the work piece. The motor 40 may now be stopped while a new work piece is mounted on the work support or the collars 65 may be adjusted to move the lever 64 only to the neutral position to stop the reciprocation of the tool head automatically when retracted, the pump valve being actuated manually by the lever 64 to feed the tool head. When desired to use the machine for rotary planer operations, at which time the tool head moves transversely of the work piece, it is only necessary to disconnect the rods 103 from the carriage 2 to permit it to move freely transversely of the tool support. The collars 65 are released from the rod 66 to permit free manual operation of the lever 68 to control the pump, and the six-way valve is set to deliver the hydraulic pressure from the pump to the carriage piston cylinder 53. At this time the locking arm 27 may be swung into engagement with the shaft to lock it against endwise movements.

While the invention has been shown and described with reference to a single embodiment, it will be understood that it is not limited to the particular details disclosed, but that this application is intended to cover such modifications or changes as may come within the scope of the following claims.

I claim:

1. In a machine tool having a work support and a bed, the combination of a tool carriage movable transversely on the bed, a spindle carrier thereon, means for adjusting the spindle carrier toward and from the work support, a spindle revolubly mounted in said spindle carrier and movable longitudinally therein toward and from the work support, a tool head on said spindle, independently operable facing and planer tools on said tool head, fluid pressure means operable axially against said spindle for moving it axially to engage the planer tools with a work piece, and independently operable fluid pressure means for moving the tool carriage and head transversely to engage the planer tools with the work piece.

2. In a machine tool having a work support and a bed, the combination of a tool carriage movable transversely on the bed, a spindle carrier thereon, means for adjusting the spindle carrier toward and from the work support, a spindle revolubly mounted in said spindle carrier and movable longitudinally therein toward and from the work support, a tool head on said spindle, independently operable facing and planer tools on said tool head, means for rotating the tool spindle, and fluid pressure devices operable to move the carriage to move the tool head transversely of the work piece to engage the planer tools therewith or to move the spindle axially on the carriage to move the facer tools on the head into operative engagement with the work piece.

3. In a machine tool having a work support and a bed, the combination of a tool carriage movable transversely on the bed, a spindle carrier thereon, means for adjusting the spindle carrier toward and from the work support, a spindle revolubly mounted in said spindle carrier and movable longitudinally therein toward and from the work support, a tool head on said spindle, independently operable facing and planer tools on said tool head, means for rotating the tool spindle, fluid pressure operated devices arranged in the bed and connected with the carriage for reciprocating the same to engage the planer tools with a work piece, and independently operable fluid pressure devices for moving the spindle axially to engage the facing tools with a work piece.

4. In a machine tool having a work support and a bed, the combination of a tool carriage movable transversely on the bed, a spindle carrier thereon, means for adjusting the spindle carrier toward and from the work support, a spindle revolubly mounted in said spindle carrier and movable longitudinally therein toward and from the work support, a tool head on said spindle, independently operable facing and planer tools on said tool head, means for rotating the tool spindle, a transversely arranged piston rod in the bed, a piston cylinder on the carriage through which said rod extends, fluid pressure devices operable to reciprocate the cylinder on the rod to move the carriage and with it the tool head to engage the planer tools with a work piece, and independently operable means for moving the tool head to engage the facer tools with a work piece.

5. In a machine tool having a work support, the combination of a tool head, a carriage movable transversely of the work support on which the tool head is mounted for axial movement toward and from a work piece on the work support, fluid pressure means operable to advance the tool head axially on the carriage into operative engagement with the work piece or to retract it therefrom, fluid pressure operated means for reciprocating the carriage to move the tool head transversely of the work piece, means engaging said tool head for controlling the operation of said fluid pressure means for moving the tool head axially, means for rendering said controlling means inoperable, and means for rendering the fluid pressure means operable to move the carriage transversely when said controlling means are inoperable.

6. In a machine tool having a work support and a bed, the combination of a tool carriage movable on the bed transversely of the work support, a spindle carrier thereon, a spindle revolubly mounted on the spindle carrier and movable axially thereon toward and from the work support, a tool head on said spindle, means for adjusting the spindle carrier to adjust the tool head toward or from the work support, a source of fluid pressure, means operable by fluid pressure from said source to move the spindle axially to move the tool head to and from the work support, and means operable by fluid pressure from said source for moving the tool carriage transversely independently of the movement of the spindle to move the tool head to and from the work support.

7. In a machine tool having a work support and a bed, the combination of a tool carriage movable transversely on the bed, a spindle carrier thereon, a spindle revolubly mounted in said spindle carrier and movable longitudinally therein toward and from the work support, a tool head on said spindle, independently operable facing and planer tools on said tool head, means for rotating the tool head, means for reciprocating the carriage to engage the planer tools with a work piece on the work support, means for adjusting the spindle carrier on the carriage axially of the tool spindle for adjusting the planer tools toward and from the work piece, and independently operable means for moving the spindle axially on its carrier to engage the facing tools with a work piece.

ALFRED TROSCH.